No. 766,168. PATENTED AUG. 2, 1904.
W. L. CASADAY.
RIDING CORN OR COTTON PLANTER.
APPLICATION FILED JAN. 26, 1903.
NO MODEL. 3 SHEETS—SHEET 1.

WITNESSES:
INVENTOR
William L. Casaday.
BY
Charles A. Hill
ATTORNEY.

No. 766,168. PATENTED AUG. 2, 1904.
W. L. CASADAY.
RIDING CORN OR COTTON PLANTER.
APPLICATION FILED JAN. 26, 1903.
NO MODEL. 3 SHEETS—SHEET 2.

WITNESSES: INVENTOR
William L. Casaday.
BY
Charles N. Kies ATTORNEY.

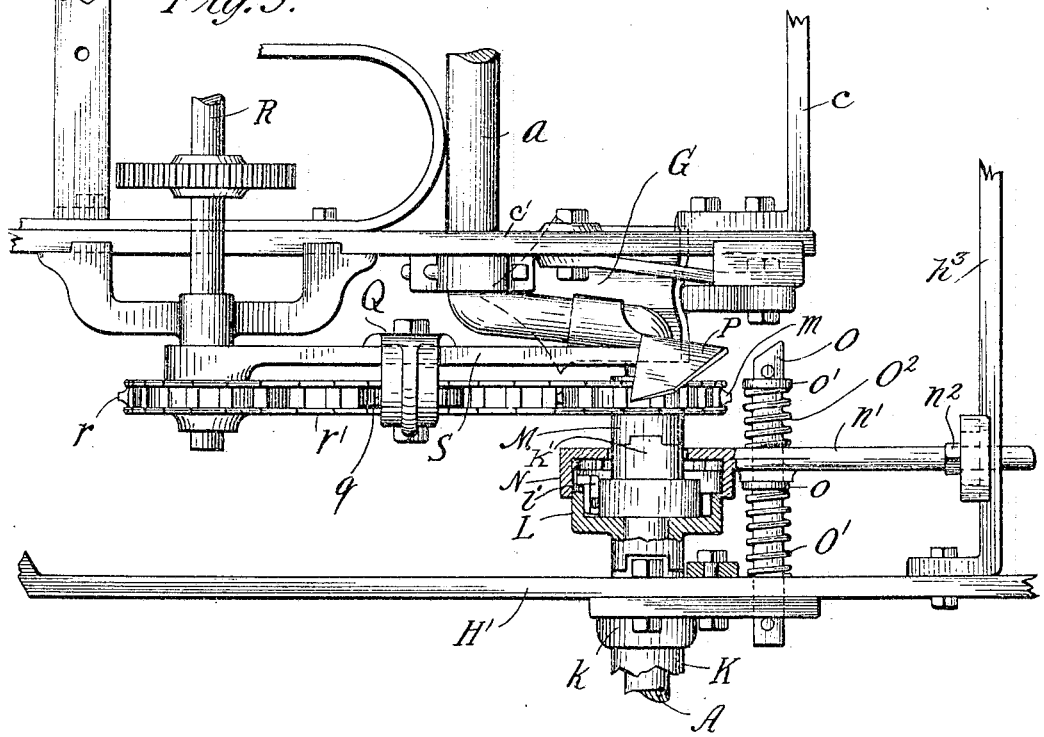
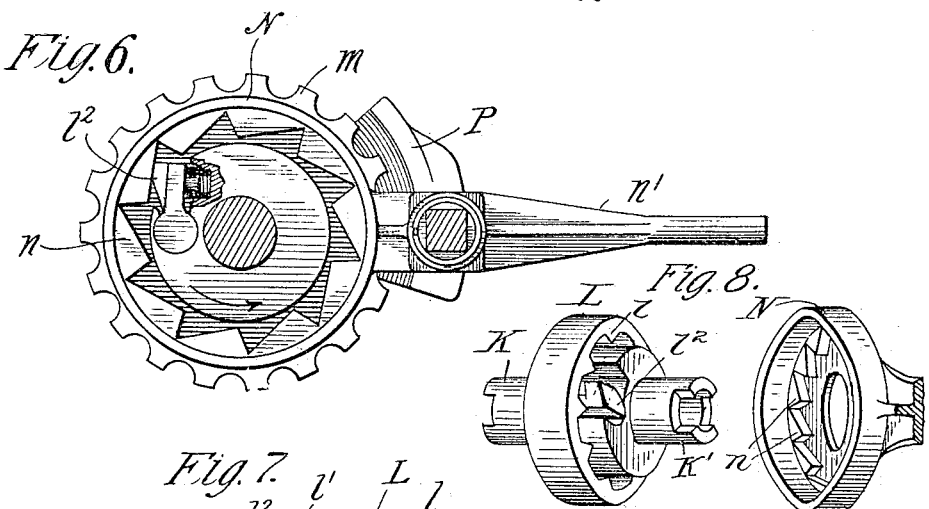
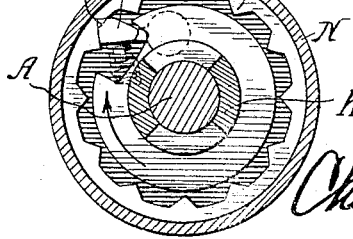
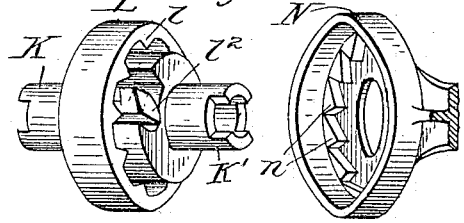

No. 766,168.  
Patented August 2, 1904.

UNITED STATES PATENT OFFICE.

WILLIAM L. CASADAY, OF SOUTH BEND, INDIANA.

RIDING CORN OR COTTON PLANTER.

SPECIFICATION forming part of Letters Patent No. 766,168, dated August 2, 1904.

Application filed January 26, 1903. Serial No. 140,680. (No model.)

*To all whom it may concern:*

Be it known that I, WILLIAM L. CASADAY, a citizen of the United States, and a resident of the city of South Bend, in the county of St.
Joseph and State of Indiana, have invented certain new and useful Improvements in Riding Corn and Cotton Planters; and I do hereby declare that the following is a full, clear, and exact description thereof, reference being had to the accompanying drawings, and to the letters of reference marked thereon, which form a part of this specification.

This invention relates to improvements in riding corn and cotton planters. Heretofore many different planters have been devised, most of which have been constructed for planting on level ground only and have proved unsuited for use in planting where raised ridges or furrows have been formed to receive the seed.

The object of my invention is to provide a planter designed to plant corn, cotton-seed, or the like either in level ground or in ground which has been ridged or furrowed in a familiar manner.

My invention embraces a comparatively simple and effective mechanism in which the weight of the operator serves in part to counterbalance the weight of the plows and to elevate the same when it is desired and which may be adjusted by the operator either to plant in level ground or in raised furrows or ridges, as preferred.

The invention embraces many novel features; and it consists in the matters hereinafter described, and more fully pointed out and defined in the appended claims.

Figure 1:
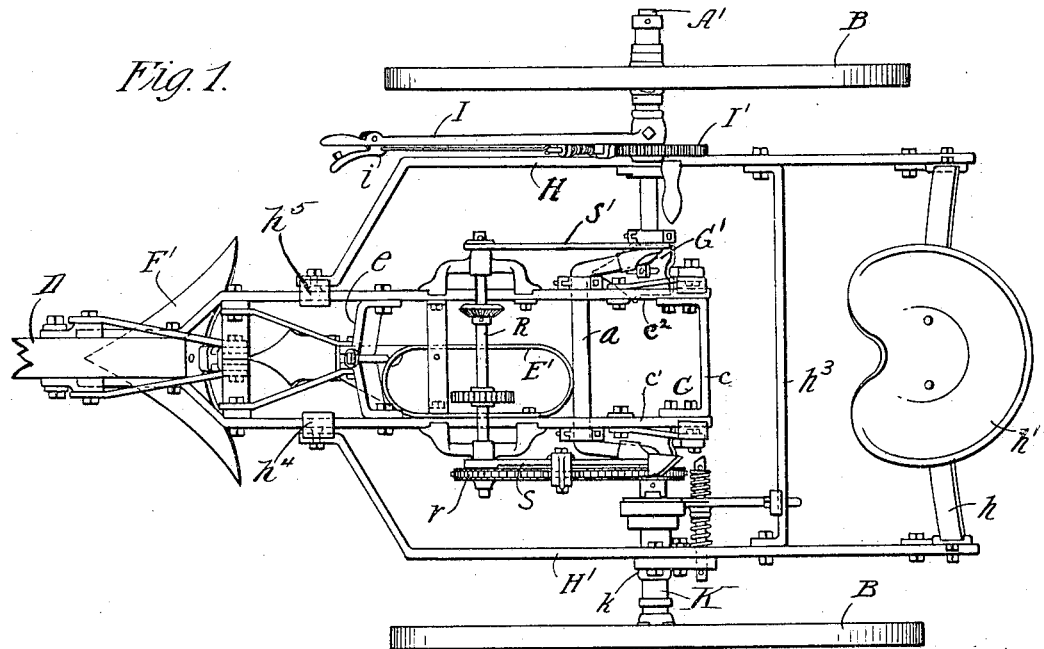
Figure 2:
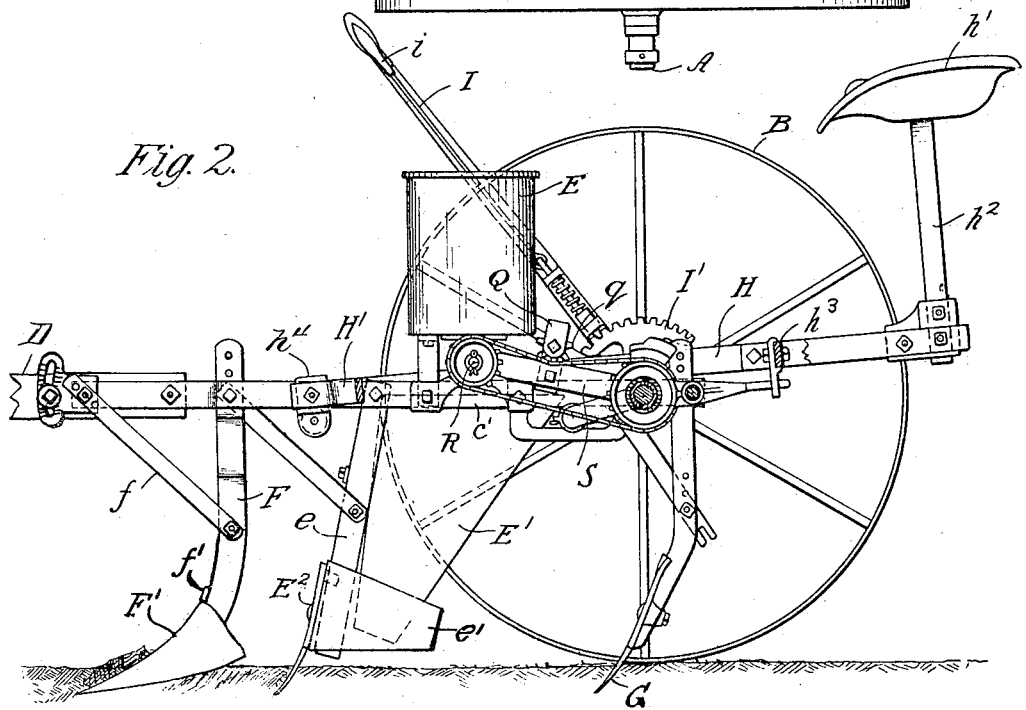
Figure 3:
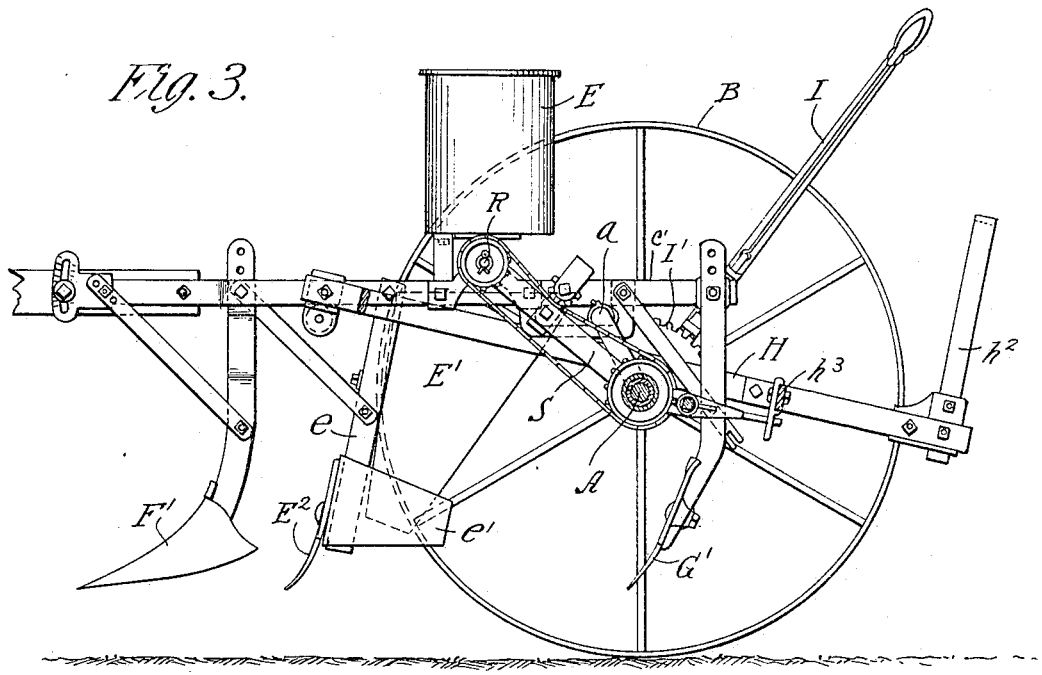
Figure 4:
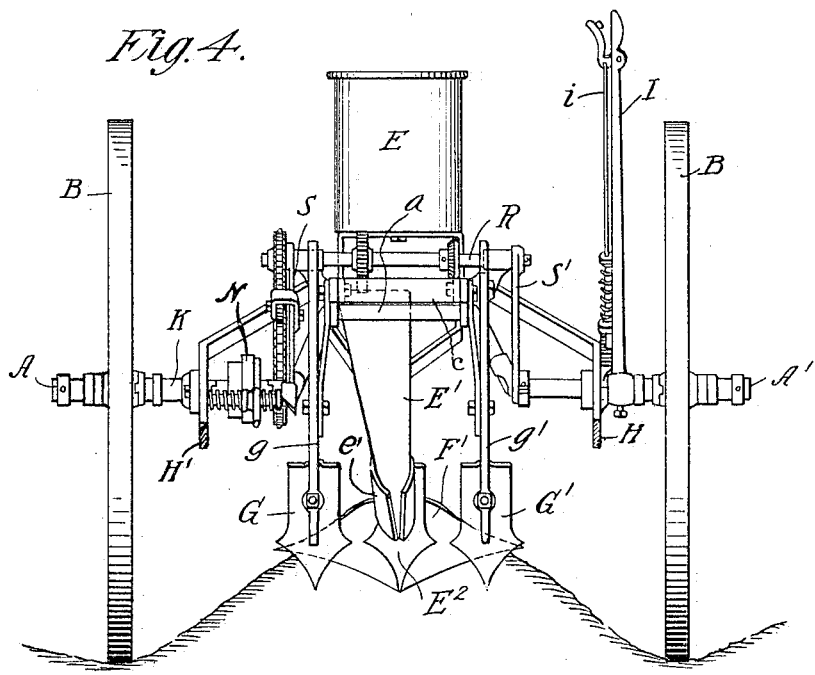

In the drawings, Figure 1 is a top plan view showing the tongue or pole of the planter broken away. Fig. 2 is a longitudinal section illustrating the position the parts assume when the planter is adjusted for planting in level ground. Fig. 3 is a similar view showing the shovels elevated. Fig. 4 is a rear elevation, partly broken, illustrating the adjustment of the parts for planting in the tops of furrows or ridges. Fig. 5 is an enlarged fragmentary detail of the driving and shifting mechanism. Fig. 6 is a fragmentary de-
tail of a part of the clutch mechanism, showing the clutch out of engagement. Fig. 7 is a
vertical section of the clutch engaged. Fig.
8 is a reduced perspective view of the clutch,
showing the parts separated.

As shown in said drawings, an axle provided at each of its extremities A and A', respectively, with wheels B is bent centrally
to form an integral crank $a$, as shown in Figs.
1 and 3, located approximately at the middle
of the axle and at its middle part extends horizontally and parallel with the same. Journaled on the central or horizontal crank portion of the axle is the low frame C, as shown,
consisting of parallel forwardly-directed bars
of iron $c'$ $c^2$ or other suitable material connected
at their rear ends by the metallic straps $c$.
At their forward ends said bars are brought
inwardly and pivotally and adjustably engaged with the rear end of the tongue D.
Supported on said plow-frame in advance of
the axle is the seedbox or hopper E, provided
with seed-dropping means driven from one of
the wheels B, as hereinafter described. Extending downwardly from the bottom of the
seedbox is the delivery-spout E', immediately
in advance of which and also carried on said
frame is a downwardly-extending standard or
beam $e$, rigidly braced from the front end of
said frame and on the lower end of which is
the furrow-marking shovel $E^2$, closely behind
which the spout E' delivers the grain or seed.
Lateral wings $e'$ are provided in a familiar
manner on each side of the beam $e$, which are
directed rearwardly on each side of and below
the spout E' and act to prevent earth falling
inwardly until the seed has been deposited at
the bottom of the cut of the marking-shovel.

In advance of the marking-shovel $E^2$ is the
vertically-adjustable standard or beam F, rigidly secured at the rear end of the tongue and
braced forwardly to the under side of the
tongue D by the brace-rod $f$. Secured on
said beam F, at a point near the lower end
thereof, is the opening-shovel F', the shank
$f'$ of which extends upwardly on the beam.
Supported from the rear end of said plow-
frame are the covering-shovels G and G',
supported from the standards or beams $g$ $g'$ and disposed laterally of the opening and marking shovels and adapted to throw the dirt from each side upon the deposited seed.

Pivotally supported upon the axle adjacent to the wheels is the seat-frame, comprising the forwardly-extending bars H and H', which at their front ends are bent inwardly and slidably engage the side bars $c'$ $c^2$ of the plow-frame, as shown in Fig. 1, by means of the clips $h^4$ and $h^5$, which are pivotally secured on said bars H H' and adapted to permit the side frame members of the plow-frame to slide therethrough to accommodate themselves to the various adjusted positions of the said frame. Connecting the rear ends of the bars H and H' is a transverse bar $h$, on which is supported the seat $h$, as shown, on a standard $h^2$, which elevates said seat above the frame to a convenient height. A bar $h^3$, connecting the side frame members H and H' in advance of the seat, serves as a foot-rest for the operator as well as affords a brace for the frame members.

Rigidly secured on the axle end A', adjacent to the seat-frame member H, is the hand-lever I, adapted to partly rotate the axle to swing the crank $a$ upwardly or downwardly and which is provided with a spring-controlled detent $i$, adapted to engage the teeth of a sector I', rigidly secured on said frame member, as shown in Fig. 2, and which acts to hold said lever and crank in any desired adjusted position.

Rotatively secured upon the end A of the axle is an elongated sleeve K, which at its outer end serves as one member of a clutch, the other member of which is provided on the inner end of the wheel-hub, as shown in Figs. 1 and 4. A bearing $k$ is provided on said sleeve, as shown in Figs. 1 and 5, and the frame member H' is pivoted thereon. Integral with the bearing-sleeve K is the clutch member L, provided with internal inclined teeth $l$, adapted to be engaged by a spring-pressed pawl $l'$, which, as shown, is seated in the flanged periphery of the clutch-sleeve K', the flanged end of which fits within said clutch member L and on the inner end of which positively engages in the complementally-shaped end of the hub M of the sprocket $m$, revolubly secured on said axle and adapted to revolve with said clutch member K'.

From the construction described it is evident that the dropping mechanism would be always in gear were not provision made to break the clutch connection at some point. For this purpose a non-rotative casing N is fitted over the clutch-sleeve K' and shaped to fit over the periphery of the clutch member L. A plurality of inwardly-directed teeth $n$, having outwardly-inclined sides, are provided within said casing, as shown in Fig. 6, which in one adjusted position of the casing lie close to the faces of the teeth $l$ in position to engage an outward projection $l^2$ on the extremity of the pawl $l'$, forcing and holding said pawl inwardly out of engagement with the teeth $l$, thereby disconnecting the clutch and holding the same out of action until said casing N moves out of engagement with the pawl. Means are provided to hold said casing normally out of operative relation with the clutch member comprising a stem $n'$, integral with said casing, which projects below the cross-bar $h^3$ and engages at its outer end through the bearing-piece $n^2$ thereon. An angular push rod or pin O is slidably secured in the frame member H' and extends through a complemental aperture in said stem and is provided with a collar $o$, which normally bears against the inner side of the stem between the same and the frame, and a collar $o'$ on the inner inclined end thereof, which projects inwardly into alinement with the adjacent arm of the axle-crank. Strong pushing-springs O' O² engage between the frame member and the collar $o$ and between the inner side of the stem and the collar $o'$, respectively, the former of which acts to normally hold said casing N inwardly out of engagement with the pawl end $l^2$, and the latter acts to throw it into engagement therewith. A cam P is provided on the axle, projecting oppositely from the crank or bent portion thereof and having a rearwardly-directed end, which when the crank is turned upwardly, or, in other words, when the plows are elevated to their greatest extent, engages the push-pin and forces the same, with the casing, inwardly into position for the inclined surfaces of the teeth $n$ to engage the end of the pawl and force the same inwardly sufficiently to disengage the teeth $l$ of the clutch member L, thus disconnecting the clutch and throwing the dropping mechanism out of action.

The seed-dropping mechanism may be of any preferred kind or construction and, as shown, is provided with a transverse shaft R, journaled in bearings supported on the shovel-frame. A sprocket-wheel $r$ is provided on the outer end of said shaft in alinement with the sprocket-wheel $m$, and a chain $r'$ or other driving means is trained around said sprocket-wheels and communicates the motion of the wheels B to the dropping means. Rigid connection is provided between the ends of the shaft R and the axle ends A A' near the crank, comprising bars S S', which engage on each. The bearing for the shovel-frame on the part $a$ of the axle is longitudinally slotted, as shown in Figs. 2 and 3, to permit the frame to slide on the axle when elevated or lowered.

A tightener or idler is provided for the sprocket-chain $r'$, comprising a bracket-arm Q, secured upon the bar S and provided with a roller $q$, journaled thereon and adapted to engage the chain, as shown in Figs. 2 and 5, and which by its adjustment serves to vary the tension of said chain.

The operation is as follows: When the driver is in position in the seat $h'$, his weight serves to balance the weight of the seedbox, shovels, tongue, &c., over the axle ends A A', thus partly supporting a part of the weight of the mechanism for the team. Should he desire to adjust the machine for planting in level ground, the lever I is released from its segment and moved forwardly, thereby turning the crank portion of the axle downwardly to the position shown in Figs. 1, 2, and 5 and permitting the shovel-frame to slide forwardly in the ends $h^4$ $h^5$ of the seat-frame members, as shown in Fig. 1. Obviously owing to the shaft R and axle ends A A' remaining at the same relative distances apart there is no change in the operative relation of the sprocket-wheels with each other. Hence the continued forward movement of the machine serves to rotate the clutches and sprocket-wheels and continues the planting operation. Should it for any reason be desirable to elevate the plow-frame, it may immediately be done by moving the lever I to the position shown in Fig. 3, thereby partly rotating the axle and elevating the crank portion thereof to the position shown in Figs. 3 and 4, said upward movement of the shaft being greatly facilitated by the weight of the driver, which serves as a counterbalance for the weight of the mechanism. Having adjusted the machine and shovels for height, it is obvious from the action of the clutch mechanism, the operation of which has been heretofore described, that the planting will continue as before.

Obviously many details of construction may be varied without departing from the principles of my invention.

I claim as my invention—

1. In a riding-planter the combination with an axle, and the wheels journaled on each end thereof, a forwardly-extending plow-frame journaled on the axle and a seat-frame pivotally supported on the axle and slidably connected at its forward end with the plow-frame and provided at the rear of the axle with a seat, said plow-frame being adapted to be raised and lowered independently of the seat-frame.

2. In a riding-planter the combination with the wheels and the axle, of a central crank on the axle, a plow-frame supported at one of its ends on said crank and at the other end supported by the draft, a lever engaged on the axle adjacent said crank and at its forward end slidably engaging said plow-frame and a seat on the end of said lever opposite its engagement with said frame.

3. In a riding-planter the combination with the wheels and an axle, of a central crank on the axle, means for adjusting said crank vertically with respect to the axle, planting mechanism partly supported on said crank, a clutch on the axle end and operatively engaged by the driving means and engaging a sprocket-wheel, a sprocket-wheel journaled on the planting-mechanism frame and a chain trained over said sprocket-wheels.

4. In a riding-planter, the combination with an axle, of a bend therein affording a crank, a shovel-frame journaled at its rear end on the crank and adapted to be elevated or lowered dependent upon the position of the crank with respect to the axle, means for adjusting the crank mechanism on said axle and shovel-frame adapted to be operatively connected with and to positively actuate dropping mechanism carried on the shovel-frame.

5. In a riding-planter the combination with an axle bent to provide a crank, of wheels at each end of the axle, a shovel-frame journaled on the crank and extending forwardly, a counterweight-frame pivotally supported on the axle and extending forwardly and slidably engaged upon the shovel-frame, and provided at the rear end with a seat for an operator, and a lever rigidly secured on the axle and a sector on the counterweight-frame, and a spring-detent on the lever adapted to engage the teeth of said sector to hold the crank in operative position with respect to the axle.

6. In a riding-planter the combination with an axle having a bend therein forming a crank, of a shovel-frame journaled on the crank and extending forwardly, a counterweight-lever pivoted on the axle and slidably engaging the front end of the shovel-frame, the rear end of the counterweight-lever having a seat thereon for an operator, a sector and a lever provided with a detent secured on the counterweight-lever and axle respectively and adapted to partly rotate the axle to elevate or depress the shovel-frame and operating means.

7. In a riding seed-planter, the combination with the wheels and the axle, of a bend in said axle forming a crank, a shovel-frame pivoted near its rear end on said crank, a counterbalancing-lever pivoted on the axle and slidably engaging the front end of the shovel-frame, seed-dropping mechanism carried on said shovel-frame, a rotative clutch driven from one of said wheels and a sprocket-wheel journaled on the axle and communicating the rotation of the clutch to the dropping mechanism.

8. In a device of the class described, the combination with an axle bent to form a crank in the length thereof, a shovel-frame carried on said crank and adapted to be adjusted vertically thereby, dropping mechanism on said frame, means for holding the dropping mechanism and axle ends in unvarying adjustment independently of the adjustment of the crank, and coacting means on one of the axle ends and dropping mechanism for actuating the dropping mechanism.

9. In a riding-planter, an axle bent centrally to provide an offset portion parallel therewith forming a crank, wheels journaled on the axle, a hub-clutch on one of the same, a rotative clutch-sleeve on the axle, one end of which engages with the hub-clutch, the other end of which engages with a complemental clutch member rotatively secured upon the axle, means for throwing said clutch members out of engagement and sprocket-wheels on the last-named clutch member and on the mechanism supported on the crank adapted to actuate said mechanism at varying adjustments of the crank.

10. In a device of the class described, the combination in a seed-planter, with a shovel-frame and its shovels, of a planting mechanism supported thereon, means operated from the axle for driving the planting mechanism and means for elevating the shovel-frame comprising a crank on the axle on which one end of the shovel-frame is supported, and a counterweight-lever journaled on the axle and slidably engaged at its forward end to said frame and acting to raise the other end thereof.

11. In a device of the class described, the combination with an axle bent to form a crank at its middle part, of wheels journaled on each end of the axle, a hub-clutch on one of the same, a rotative clutch-sleeve adapted at one end to engage said hub-clutch and at the other provided with a clutch member, and automatically-operated means acting to connect said clutch member with seed-dropping mechanism adjustably supported on the crank in certain adjusted position and to disconnect the same in others.

12. In a riding-planter the combination with an axle, of a sprocket-wheel rotatively engaged thereon, a rotative clutch member normally engaging the sprocket-wheel and a rotative sleeve-clutch driven from one of the wheels and adapted to communicate its rotation to said clutch member and sprocket-wheel, a pawl engaged in said clutch member and normally engaging the sleeve-clutch and means slidable on the axle acting to engage said pawl and throw the clutch out of engagement.

13. In a riding-planter the combination with the wheels of a bent axle forming a crank, of means for adjusting the crank vertically by a partial rotation of the axle, a sprocket-wheel journaled on the axle, means for communicating the rotation of one of said wheels to said sprocket-wheel embracing coacting clutch members, a spring-controlled pawl engaging said clutch members in operative relation, an integrally-toothed casing slidably engaged upon one of said members, means for disengaging said clutch members comprising a cam on a part of the frame acting when the adjustment is varied to engage said teeth on the pawl and throw it out of engagement.

14. The combination with the wheels and an axle, of an offset portion in the axle forming a crank, means for adjusting the crank vertically with respect to the axle and for rigidly holding the same in their adjusted position, dropping and covering mechanisms supported on said crank, a counterbalancing-frame engaged on the axle and extending forwardly into sliding engagement with and acting to support the front end of the dropping and covering mechanism and a seat supported on the rear end of said frame.

15. In a machine of the class described, the combination with the wheels of a hub-clutch on one of the same, an axle, a rotative sleeve shaped at each end to form a clutch, one of which engages with the hub-clutch, a sprocket-wheel journaled on the axle and driven from the clutch, planting mechanism supported on the axle, means for adjusting said planting mechanism vertically without affecting the relation of the driving parts, a counterbalance acting to support the end of the planting mechanism remote from the axle and a cam on said crank portion of the axle acting when the crank is fully elevated to break the connection between the parts of the clutch.

16. The combination with an axle, of planting mechanism supported thereon, rotative means on said axle driven from one of the wheels for actuating the planting mechanism, a lever pivoted on the axle and slidably engaging on the planter mechanism and on the rear end of which is the driver's seat acting to elevate the planter mechanism and to slide the same rearwardly, and automatic means permitting adjustment of the planter mechanism a distance less than its maximum elevation without affecting the planting operation.

17. The combination with a shaft having a central crank therein, of a planter-frame supported thereon at its rear end, opening, marking and covering shovels carried thereon, a frame pivoted on the axle and extending forwardly into sliding engagement with the front end of the planter-frame and at the rear of the axle provided with a seat for the driver, a segment rigidly secured on one of the frame members and a lever and detent engaged on the axle and adapted to turn said crank uppermost and together with the weight of the driver, acting to elevate the planter mechanism horizontally, and rigid bars connecting the planter mechanism with the axle ends and holding the same in unvarying relation.

In witness whereof I have hereunto subscribed my name in the presence of two subscribing witnesses.

WILLIAM L. CASADAY.

Witnesses:
 ADOLPH S. GINZ,
 R. E. RICHARDES.